(12) United States Patent
    Suzuki (10) Patent No.: US 11,039,287 B2
(45) Date of Patent: Jun. 15, 2021

(54) IN-VEHICLE INFORMATION PROCESSING SYSTEM, NON-TRANSITORY STORAGE MEDIUM STORING PROGRAM, AND DEVICE

(71) Applicant: TOYOTA JIDOSHA KABUSHIKI KAISHA, Toyota (JP)

(72) Inventor: Koichi Suzuki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/542,825

(22) Filed: Aug. 16, 2019

(65) Prior Publication Data

US 2020/0112842 A1    Apr. 9, 2020

(30) Foreign Application Priority Data

Oct. 4, 2018  (JP) .............................. JP2018-189512

(51) Int. Cl.
    *H04W 4/48*    (2018.01)
    *H04W 4/20*    (2018.01)
    *G08C 17/02*   (2006.01)

(52) U.S. Cl.
    CPC .............. *H04W 4/48* (2018.02); *G08C 17/02* (2013.01); *H04W 4/20* (2013.01)

(58) Field of Classification Search
    CPC .......... H04W 4/48; H04W 4/20; G08C 17/02; B60R 16/02; G06F 8/65
    See application file for complete search history.

(56) References Cited

U.S. PATENT DOCUMENTS

| 2012/0098717 | A1* | 4/2012 | Petrucci | H01Q 21/28 343/713 |
| 2013/0059538 | A1* | 3/2013 | King, II | H04W 4/48 455/41.2 |
| 2013/0273847 | A1* | 10/2013 | Le | H04L 12/189 455/41.2 |
| 2014/0148093 | A1* | 5/2014 | Nguyen | H04B 7/15507 455/11.1 |
| 2014/0189528 | A1* | 7/2014 | Chang | H04M 1/72552 715/752 |
| 2015/0256276 | A1* | 9/2015 | Jones | H04H 60/65 455/3.01 |

(Continued)

FOREIGN PATENT DOCUMENTS

JP    2018-086894 A    6/2018

*Primary Examiner* — Ankur Jain
(74) *Attorney, Agent, or Firm* — Sughrue Mion, PLLC (57) ABSTRACT

An in-vehicle information processing system includes a first in-vehicle device included in a vehicle, a second in-vehicle device connected to be communicable with the first in-vehicle device through an in-vehicle network and included in the vehicle, and a control device detachably connected to the first in-vehicle device. The control device is configured to store information to be used in control of the second in-vehicle device and transmit, to the first in-vehicle device, a signal including a control command to the second in-vehicle device. The first in-vehicle device is configured to convert the signal including the control command to the second in-vehicle device received from the control device to be transmittable through the in-vehicle network and transmit the signal to the second in-vehicle device.

6 Claims, 5 Drawing Sheets

(56) References Cited

U.S. PATENT DOCUMENTS

| | | | |
|---|---|---|---|
| 2015/0280805 A1* | 10/2015 | Scheim | H04W 52/285 |
| | | | 455/11.1 |
| 2017/0111864 A1* | 4/2017 | Ashworth | H04W 52/0229 |
| 2018/0118186 A1* | 5/2018 | Yl | B60L 58/10 |
| 2018/0167784 A1* | 6/2018 | Sute | H04W 4/023 |
| 2019/0027137 A1* | 1/2019 | Sohn | G10L 15/22 |
| 2019/0123774 A1* | 4/2019 | Zhan | H04Q 1/08 |
| 2019/0159063 A1* | 5/2019 | Janik | H04L 67/306 |
| 2019/0230206 A1* | 7/2019 | Halash | H04M 1/6075 |
| 2020/0021354 A1* | 1/2020 | Ashworth | H01Q 1/3283 |

* cited by examiner

IN-VEHICLE INFORMATION PROCESSING SYSTEM, NON-TRANSITORY STORAGE MEDIUM STORING PROGRAM, AND DEVICE

INCORPORATION BY REFERENCE

The disclosure of Japanese Patent Application No. 2018-189512 filed on Oct. 4, 2018 including the specification, drawings and abstract is incorporated herein by reference in its entirety.

BACKGROUND

1. Technical Field

The present disclosure relates to an in-vehicle information processing system, a non-transitory storage medium storing a program, and a device.

2. Description of Related Art

In a technique relating to control of an in-vehicle device included in a vehicle, updating (adding, correcting, deleting, or the like) of information to be used in the control of the in-vehicle device is known. For example, Japanese Unexamined Patent Application Publication No. 2018-086894 (JP 2018-086894 A) discloses a technique that, in a case where determination is made that a vehicle is parked at a safe place, performs so-called over-the-air (OTA) reprogramming for rewriting a program stored in a storage device mounted in the vehicle through wireless communication.

SUMMARY

In the technique relating to the control of the in-vehicle device included in the vehicle described above, in order to supply electric power to the in-vehicle device, update processing may be performed in a state in which the vehicle is powered on. While the vehicle is powered on during the update processing of the in-vehicle device, the use of the vehicle may be limited from a viewpoint of safety or the like. In addition, in a case where information to be used in the update processing is acquired in a wireless manner, and the amount of information to be acquired is large, a time needed for the update processing may increase due to a communication speed, a communication state, or the like of wireless communication equipment. Accordingly, in the technique relating to the control of the in-vehicle device included in the vehicle, there is room for improvement on updating of information to be used in the control of the in-vehicle device.

The disclosure relates to an in-vehicle information processing system, a non-transitory storage medium storing a program, and a device that improve convenience of a technique relating to control of an in-vehicle device included in a vehicle.

A first aspect of the disclosure relates to an in-vehicle information processing system. The in-vehicle information processing system includes a first in-vehicle device, a second in-vehicle device, and a control device. The first in-vehicle device is included in a vehicle. The second in-vehicle device is connected to be communicable with the first in-vehicle device through an in-vehicle network and is included in the vehicle. The control device is configured to be detachably connected to the first in-vehicle device. The control device is configured to store information to be used in control of the second in-vehicle device and transmit, to the first in-vehicle device, a signal including a control command to the second in-vehicle device. The first in-vehicle device is configured to convert the signal including the control command to the second in-vehicle device received from the control device to be transmittable through the in-vehicle network and transmit the converted signal to the second in-vehicle device.

In the in-vehicle information processing system according to the first aspect of the disclosure, the control device may be configured to update the information to be used in the control of the second in-vehicle device in a state of being not connected to the first in-vehicle device.

In the in-vehicle information processing system according to the first aspect of the disclosure, the control device may be configured to store the information to be used in the control of the second in-vehicle device in association with information for specifying the vehicle in which the second in-vehicle device is included.

In the in-vehicle information processing system according to the first aspect of the disclosure, the control device may be configured to store the information to be used in the control of the second in-vehicle device in association with information for specifying a user.

In the first aspect, the second in-vehicle device may be configured to control at least one of accessory device of the vehicle.

In the above configuration, the second in-vehicle device may be configured to control the at least one accessory device of the vehicle based on the signal received from the first in-vehicle device.

In the first aspect, the second in-vehicle device may be configured to control at least one of a car navigation system, a media player, an in-vehicle sensor, air conditioning device, and an actuator configured to change a seat position, of the vehicle.

A second aspect of the disclosure relates to a non-transitory storage medium storing a program. When the program is executed by a control device that is detachably connected to a first in-vehicle device included in a vehicle, the program causes the control device to execute operations including: storing information to be used in control of a second in-vehicle device connected to be communicable with the first in-vehicle device through an in-vehicle network and included in the vehicle; transmitting, to the first in-vehicle device, a signal including a control command to the second in-vehicle device; and causing the first in-vehicle device to convert the signal including the control command to the second in-vehicle device to be transmittable through the in-vehicle network and to transmit the signal to the second in-vehicle device.

A third aspect of the disclosure provides a device which is configured to function as a first in-vehicle device included in a vehicle, and is configured to be detachably connected to a control device that stores information to be used in control of a second in-vehicle device. The device includes circuitry configured to: communicate with the second in-vehicle device included in the vehicle through an in-vehicle network; receive a signal including a control command to a second in-vehicle device from the control device; convert the received signal including the control command to the second in-vehicle device to be transmittable through the in-vehicle network; and transmit the converted signal to the second in-vehicle device.

According to the aspects of the disclosure, convenience of a technique relating to control of an in-vehicle device included in a vehicle using a terminal device is improved.

BRIEF DESCRIPTION OF THE DRAWINGS

Features, advantages, and technical and industrial significance of exemplary embodiments in the disclosure will be described below with reference to the accompanying drawings, in which like numerals denote like elements, and wherein.

DETAILED DESCRIPTION OF EMBODIMENTS

Hereinafter, an embodiment in the disclosure will be described referring to the drawings.

Configuration of In-Vehicle Information Processing System

Figure 1:
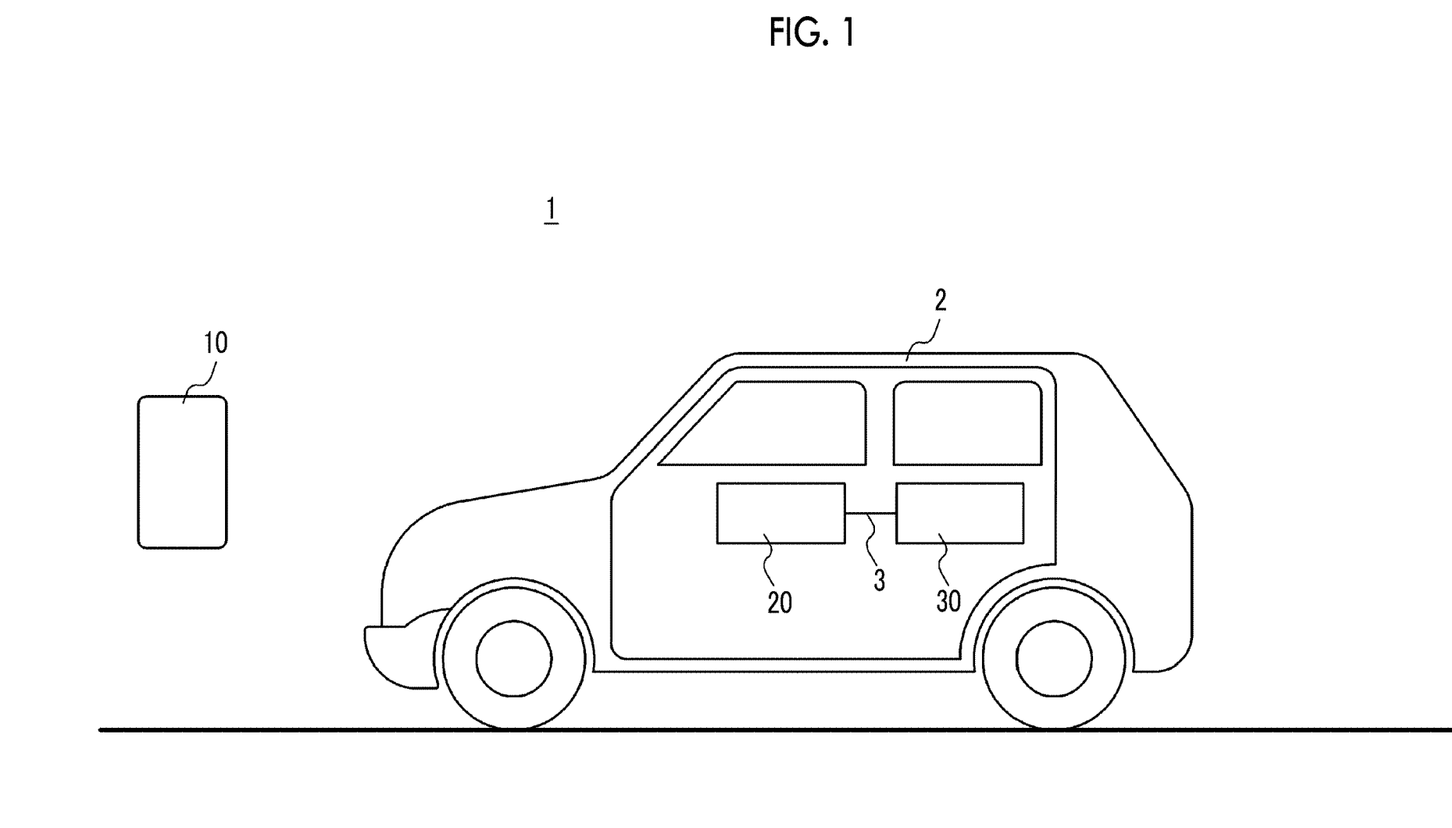
FIG. 1 is a schematic configuration diagram of an in-vehicle information processing system according to an embodiment in the disclosure.

The outline of an in-vehicle information processing system 1 according to an embodiment will be described referring to FIG. 1. The in-vehicle information processing system 1 includes a control device 10, and a first in-vehicle device 20 and a second in-vehicle device 30 that are included in a vehicle 2. For simplification of description, FIG. 1 shows one control device 10, one first in-vehicle device 20, and one second in-vehicle device 30. However, the number of control devices 10, the number of first in-vehicle devices 20, and the number of second in-vehicle devices 30 included in the in-vehicle information processing system 1 may be optionally determined.

The vehicle 2 is, for example, an automobile. The vehicle 2 is not limited to an automobile, and may be any vehicle that a person can board. The control device 10 is, for example, a card or stick-type small personal computer (PC). The control device 10 is not limited to a card or stick-type small personal computer (PC), and may be a general-purpose mobile terminal, such as a smartphone or a tablet terminal, or any portable equipment, such as an information processing device dedicated to the in-vehicle information processing system 1. The control device 10 is inserted into a slot of the first in-vehicle device 20, or the like to be detachably connected to the first in-vehicle device 20. In a case where the control device 10 is connected to the first in-vehicle device 20, the control device 10 is connected to be communicable with the first in-vehicle device 20 through a USB terminal or the like. The first in-vehicle device 20 is, for example, an interface box or the like. The first in-vehicle device 20 is not limited to an interface box, and may be any electronic device that is connectable to an in-vehicle network 3, such as a controller area network (CAN), and is provided in the vehicle 2. The first in-vehicle device 20 is connected to be communicable with the second in-vehicle device 30 through the in-vehicle network 3. The second in-vehicle device 30 may be the control device (electronic control unit (ECU)) or any accessory device provided in the vehicle 2. The accessory device may be, for example, any electronic device, such as a communication device (data communication module (DCM)), a car navigation system, a media player, or an in-vehicle sensor of the vehicle 2. Examples of the accessory device may further include an actuator configured to a seat position of the vehicle 2, and an air conditioning device of the vehicle 2. The first in-vehicle device 20 and the second in-vehicle device 30 may be provided detachably in the vehicle 2 or may be provided integrally with the vehicle 2.

Operation Example of In-Vehicle Information Processing System

An operation example of the in-vehicle information processing system 1 according to the embodiment will be described referring to FIG. 1. A user of the control device 10 stores information to be used in control of the second in-vehicle device 30 of the vehicle 2 in the control device 10 in advance before the user boards the vehicle 2. For example, the user may store route information to be used in a car navigation system in the control device 10 before boarding. Alternatively, the user may install a program for transmitting a control command to an ECU of the vehicle 2 on the control device 10 before boarding. In the control command, for example, change of a seat position, temperature setting of air conditioning, or the like may be included.

The user of the control device 10 connects the control device 10 to the first in-vehicle device 20 when boarding the vehicle 2. The control device 10 is connected to the first in-vehicle device 20, thereby instantly controlling the second in-vehicle device 30, such as the car navigation system and the ECU. With this, the control device 10 makes the car navigation system perform route setting. Furthermore, the control device 10 makes the ECU of the vehicle 2 perform change of the seat position and temperature setting of air conditioning. Accordingly, the user can instantly use the second in-vehicle device 30 without waiting until an operation of the second in-vehicle device 30 is performed or without waiting until update processing based on OTA reprogramming or the like is completed in a state in which the vehicle 2 is power on, and convenience of a technique for controlling an in-vehicle device included in a vehicle is improved.

Next, each configuration of the in-vehicle information processing system 1 will be described in detail.

Configuration of Control Device

Figure 2:
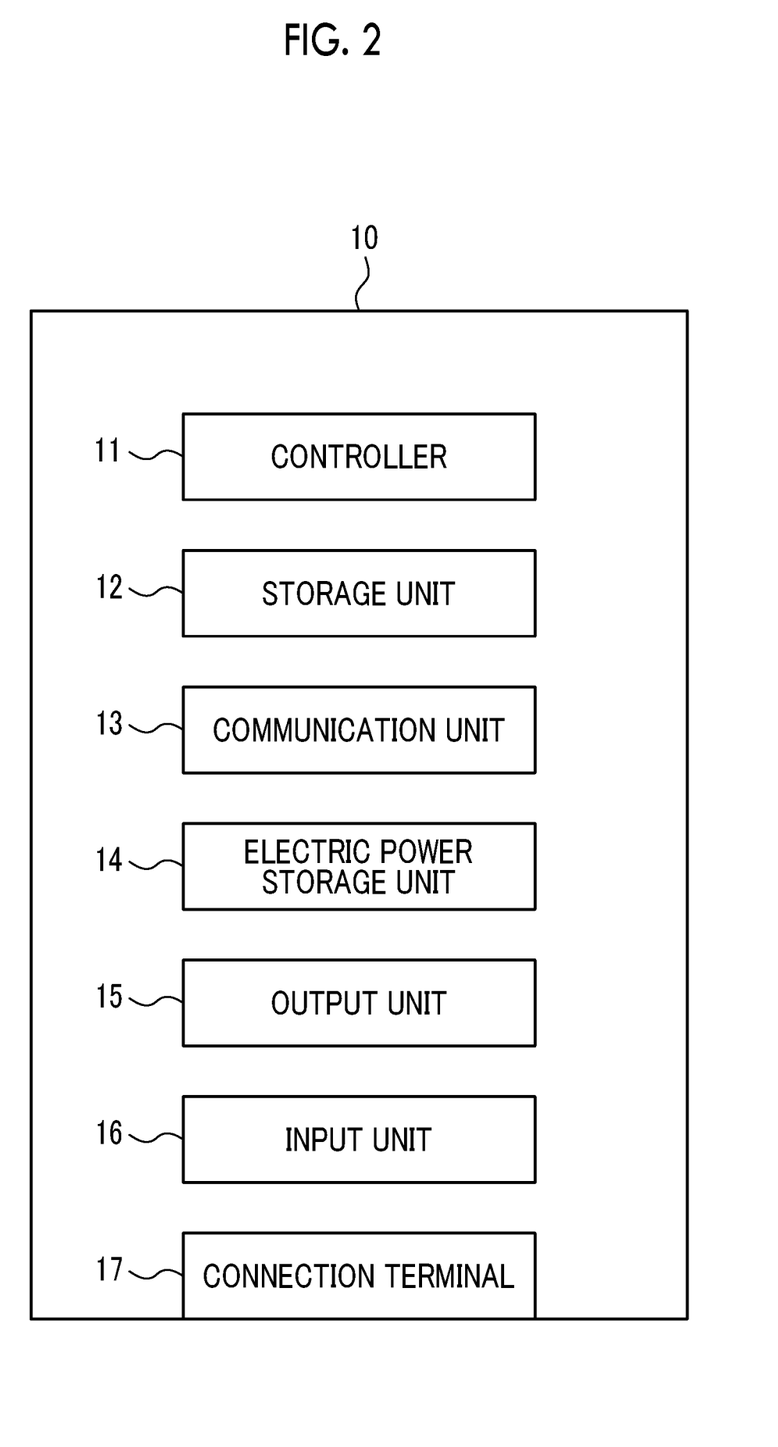
FIG. 2 is a block diagram showing the schematic configuration of a control device.

As shown in FIG. 2, the control device 10 includes a controller 11, a storage unit 12, a communication unit 13, an electric power storage unit 14, an output unit 15, an input unit 16, and a connection terminal 17. The controller 11 is electrically connected to the storage unit 12, the communication unit 13, the electric power storage unit 14, the output unit 15, the input unit 16, and the connection terminal 17.

The controller 11 includes at least one processor in order to provide control and processing ability for executing various functions. The controller 11 may control the storage unit 12, the communication unit 13, the electric power storage unit 14, the output unit 15, the input unit 16, and the connection terminal 17 described below, respectively, in order to implement the functions of the units. In the embodiment, the "processor" is a general-purpose processor or a dedicated processor specific to specified processing, but is not limited thereto. Details of processing of the controller 11 will be described below.

The storage unit 12 stores information, a program, and the like to be used in processing for controlling the functions of the control device 10. The storage unit 12 may be, for example, a semiconductor memory, a magnetic memory, an optical memory, or the like. The storage unit 12 may function as, for example, a main storage device or an auxiliary storage device. The storage unit 12 may be a cache memory included in the controller 11, or the like. Alternatively, the storage unit 12 may be a volatile storage device or a nonvolatile storage device. In the embodiment, for example, as described below in detail, the storage unit 12 may store information or the like to be used in the control of the second in-vehicle device 30.

The communication unit 13 performs communication with the first in-vehicle device 20 included in the vehicle 2 under the control of the controller 11. The communication unit 13 may be communicable with the first in-vehicle device 20 included in the vehicle 2 in a case where the connection terminal 17 described below is connected to a connection terminal 27 of the first in-vehicle device 20. The communication unit 13 may include any wired communication module, such as a USB communication module, a High Definition Multimedia Interface (HDMI (Registered Trademark)) communication module, or a wireless local area network (LAN) communication module, in order to perform communication with the first in-vehicle device 20. The communication unit 13 is not limited to wired communication, and may include any wireless communication module, such as a wireless LAN communication module, a Bluetooth (Registered Trademark) communication module, or a mobile communication standard, such as 4th Generation (4G) or 5th Generation (5G). The communication unit 13 may include an in-vehicle network communication module, such as a CAN communication module. For this reason, the control device 10 may be not an electronic apparatus for a vehicle including the in-vehicle network communication module, such as the CAN communication module, but may be a general-purpose electronic apparatus.

The electric power storage unit 14 supplies electric power to be used in the operation of the control device 10. The electric power storage unit 14 may be, for example, a dry battery or a storage battery. The electric power storage unit 14 may include, for example, an adapter for receiving power supply from an external power supply, and may be supplied with electric power from the external power supply. Examples of the adapter for receiving power supply from the external power supply may include an AC power adapter and the like.

The output unit 15 outputs information in a form of sound, vibration, light, an image, or the like under the control of the controller 11. The output unit 15 may include, for example, at least one of a speaker, a vibrator, a light, a display device, and the like. The output unit 15 may output information regarding a connection state to the first in-vehicle device 20, a result of the control of the second in-vehicle device 30, or the like. For example, in a case where the control device 10 is connected to the first in-vehicle device 20, the output unit 15 may output information to the display device and may notify the user of the connection to the first in-vehicle device 20.

The input unit 16 receives an input operation from the user. The input unit 16 may include, for example, at least one of a physical key, such as a power button, an input device, such as a touch panel, a microphone that receives a voice input, a camera that receives a gesture input, and the like. In a case where an input operation of the user is received, the input unit 16 transmits the input operation as electronic information to the controller 11. Examples of the input operation of the user may include an operation to input information to be used in the control of the second in-vehicle device 30 described below.

The connection terminal 17 is connected to the connection terminal 27 of the first in-vehicle device 20. The connection terminal 17 may be connected to the connection terminal 27 of the first in-vehicle device 20, for example, in a case where the control device 10 is inserted into the slot of the first in-vehicle device 20. The control device 10 is connected to be communicable with the first in-vehicle device 20 included in the vehicle 2 in a case where the connection terminal 17 is connected to the connection terminal 27 of the first in-vehicle device 20. Example of the connection terminal 17 may include a USB terminal, an HDMI terminal, a LAN terminal, or the like.

In a case where the connection terminal 17 is connected to the connection terminal 27 of the first in-vehicle device 20, the controller 11 may control the functions of the first in-vehicle device 20. For example, the controller 11 may make information be output from an output unit 25 in the first in-vehicle device 20 or may receive an input operation from the user through an input unit 26 in the first in-vehicle device 20. Alternatively, for example, in a case where the connection terminal 17 is connected to the connection terminal 27 of the first in-vehicle device 20, the controller 11 may start power supply from a power supply unit 24 in the first in-vehicle device 20 to the host device.

Hereinafter, processing of the control device 10 that is implemented by the controller 11 controlling the functions of the control device 10 will be described. The control device 10 stores information to be used in the control of the second in-vehicle device 30. Information to be used in the control of the second in-vehicle device 30 may include a control command set, setting information, a program, and the like for transmitting a signal including a control command to the second in-vehicle device 30. The control device 10 transmits, to the first in-vehicle device 20, the signal including the control command to the second in-vehicle device 30 using information to be used in the control of the second in-vehicle device 30.

For example, in a case where the second in-vehicle device 30 is the car navigation system, examples of the control command to the second in-vehicle device 30 may include a control command for display of setting of route information, facility information registered previously, and a previous movement history, or the like. In a case where the second in-vehicle device 30 is the media player, examples of the control command to the second in-vehicle device 30 may include a control command for reproduction of a musical piece, display of a playlist, or the like. In a case where the second in-vehicle device 30 is the ECU of the vehicle 2, examples of the control command to the second in-vehicle device 30 may include a control command for display of meta information to a cockpit, change of the seat position, temperature setting of air conditioning, or the like. The control command to the second in-vehicle device 30 is not limited to the above-described control commands, and may include any control command according to the type, purpose, or the like of the second in-vehicle device 30.

The control device 10 may update information to be used in the control of the second in-vehicle device 30 in a state of being not connected to the first in-vehicle device 20. The control device 10 may be connected to be communicable with, for example, an information processing device, such as a PC, and may update, for example, add, correct, delete, or the like information to be used in the control of the second in-vehicle device 30 of the host device based on information received from the PC. With this, for example, the user of the control device 10 can operate the PC to update information to be used in the control of the second in-vehicle device 30, stored in the control device 10 before boarding the vehicle 2. A timing at which the control device 10 updates information to be used in the control of the second in-vehicle device 30 is not limited to a state in which the control device 10 is not connected to the first in-vehicle device 20. For example, the control device 10 may appropriately update information to be used in the control of the second in-vehicle device 30 in a state in which the control device 10 is connected to the first in-vehicle device 20 through mobile communication, such as 4G or 5G. At this time, the vehicle 2 may not be powered on.

The control device 10 may store information to be used in the control of the second in-vehicle device 30 in association with information for specifying the vehicle 2, in which the second in-vehicle device 30 is included. Information for specifying the vehicle 2 may include, for example, information regarding the type, model, frame number, or the like of the vehicle 2. For example, in a case of boarding the vehicle 2 that is an electric vehicle, the user of the control device 10 may store information to be used in the control of the second in-vehicle device 30 for the electric vehicle in the control device 10. Alternatively, in a case of boarding the vehicle 2 that is an engine vehicle, the user of the control device 10 may update information to be used in the control of the second in-vehicle device 30 stored in the control device 10 to information for the engine vehicle.

The control device 10 may store information to be used in the control of the second in-vehicle device 30 in association with information for specifying the user. Information for specifying the user may include, for example, an identifier (ID) or the like unique to the user. The control device 10 may designate, for example, the ID at the time of being connected to the first in-vehicle device 20 of the vehicle 2, thereby creating a control command to the second in-vehicle device 30 using information to be used in the control of the second in-vehicle device 30 associated with the ID. Alternatively, for example, in a case where the control device 10 is connected to the first in-vehicle device 20 of the vehicle 2, the control device 10 may download information relating to the user associated with the ID from a server provided outside the vehicle 2 through mobile communication, such as 4G or 5G to create a control command to the second in-vehicle device 30.

Processing Example of Control Device

Figure 3:
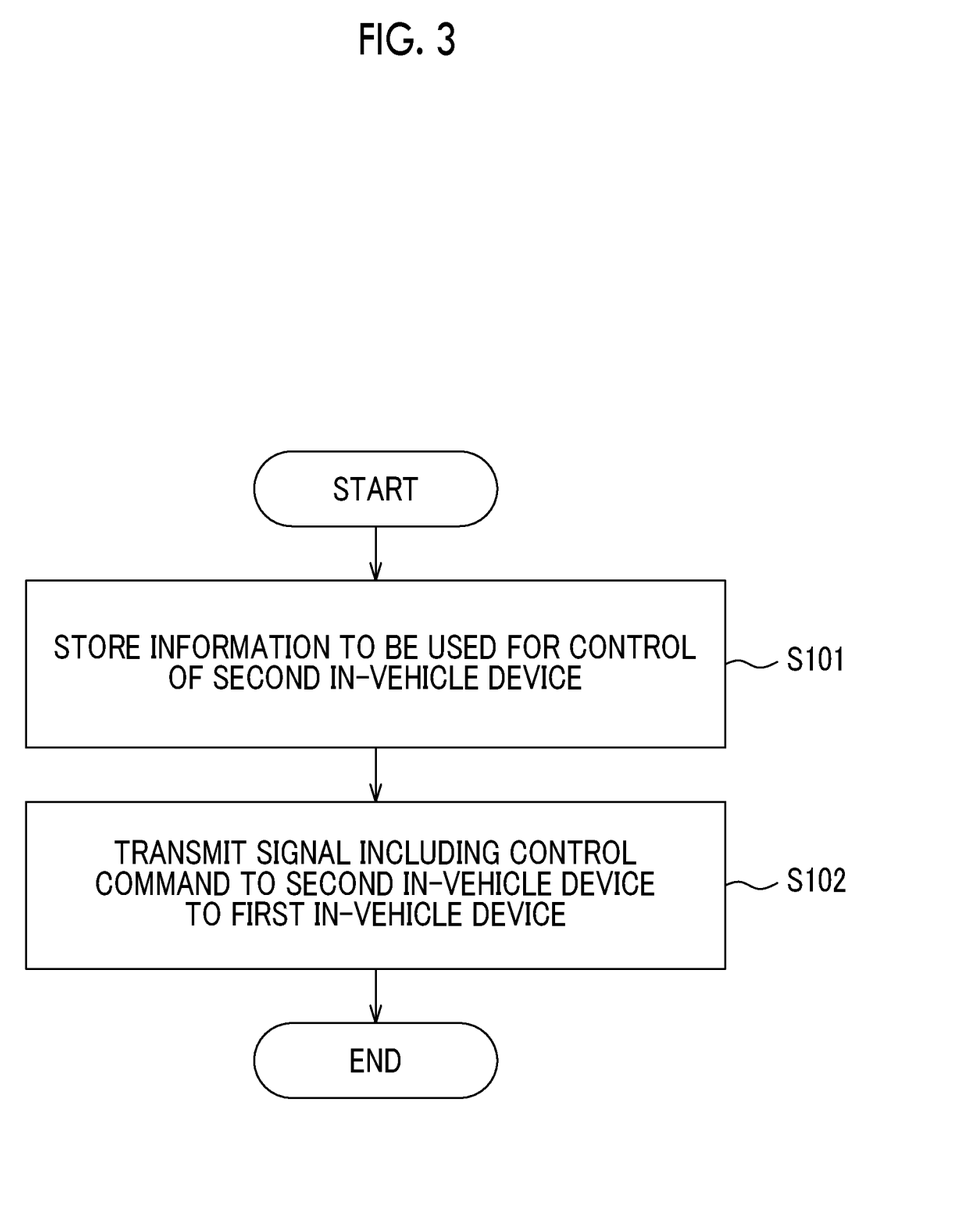
FIG. 3 is a sequence diagram showing the operation of the control device.

A flow of the processing of the control device 10 according to the embodiment will be described referring to FIG. 3.

Step S101: The control device 10 stores information to be used in the control of the second in-vehicle device 30.

Step S102: The control device 10 transmits, to the first in-vehicle device 20, the signal including the control command to the second in-vehicle device 30. With this, the control device 10 may make the first in-vehicle device 20 convert the signal including the control command to the second in-vehicle device 30 to be transmittable through the in-vehicle network 3 and transmit the signal to the second in-vehicle device 30.

Configuration of Vehicle Including In-Vehicle Device

Figure 4:
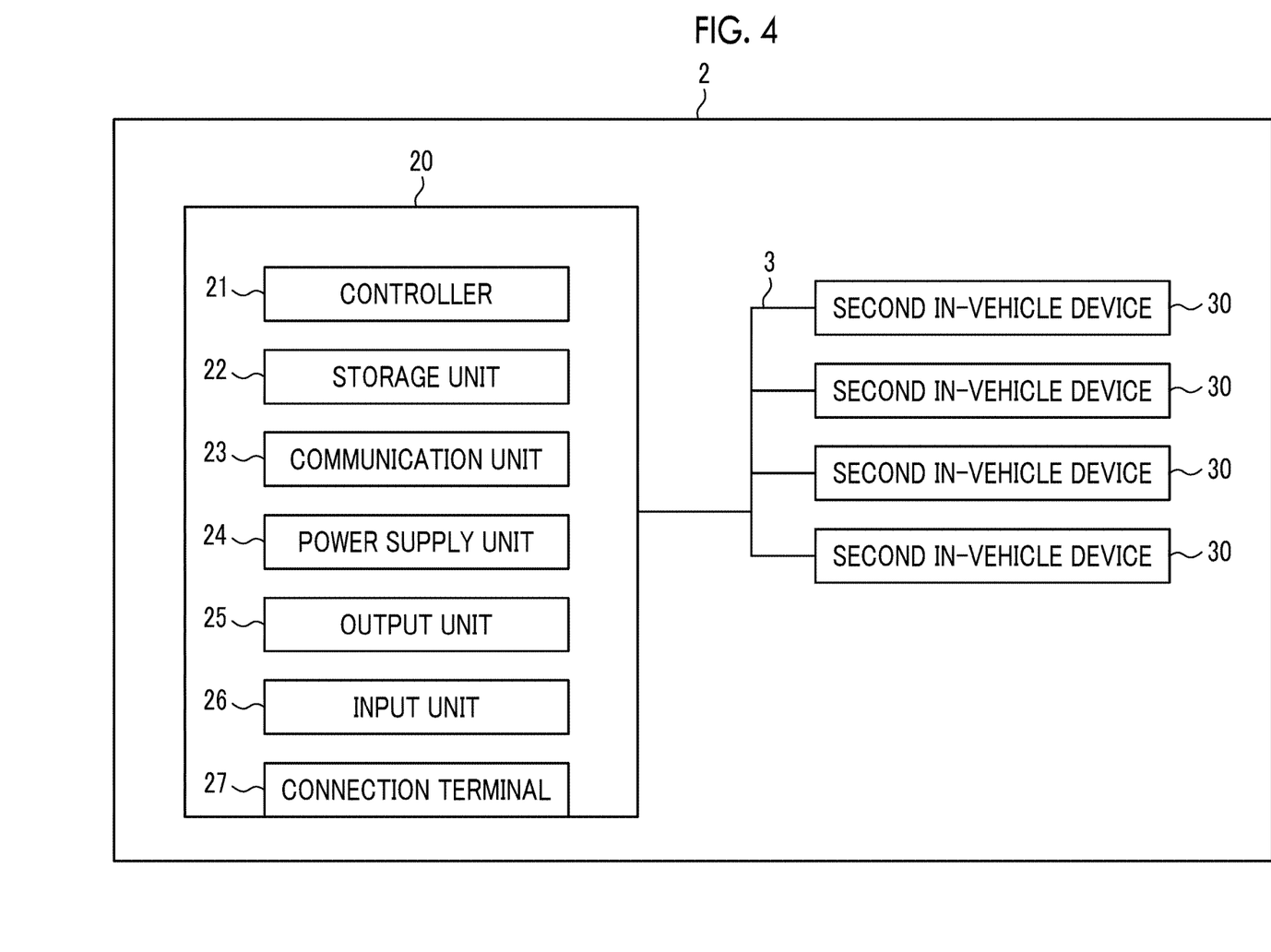
FIG. 4 is a block diagram showing the schematic configuration of a vehicle including a first in-vehicle device.

FIG. 4 is a functional block diagram schematically showing the configuration of the vehicle 2 including the first in-vehicle device 20 and the second in-vehicle device 30. Although the first in-vehicle device 20 includes the interface box as described above, the first in-vehicle device 20 may be any electronic device that is connectable to the in-vehicle network 3 and is provided in the vehicle 2. In the vehicle 2, at least one second in-vehicle device 30 may be included in addition the first in-vehicle device 20. Examples of the second in-vehicle device 30 include the ECU, the DCM, the in-vehicle sensor, the car navigation system, the media player, and the like. The second in-vehicle device 30 is not limited thereto, and may be any in-vehicle device provided in the vehicle 2. The first in-vehicle device 20 may be connected to communicable with the second in-vehicle device 30 through, for example, the in-vehicle network 3, such as a CAN communication network. The first in-vehicle device 20 and the second in-vehicle device 30 may be provided integrally or may be provided detachably in the vehicle 2.

The first in-vehicle device 20 includes a controller 21, a storage unit 22, a communication unit 23, the power supply unit 24, the output unit 25, the input unit 26, and the connection terminal 27. The controller 21 is electrically connected to the storage unit 22, the communication unit 23, the power supply unit 24, the output unit 25, the input unit 26, and the connection terminal 27.

The controller 21 includes at least one processor in order to provide control and processing ability for executing various functions. The controller 21 may control the storage unit 22, the communication unit 23, the power supply unit 24, the output unit 25, the input unit 26, and the connection terminal 27 described below, respectively, in order to implement the functions of the units. Details of processing of the controller 21 will be described below.

The storage unit 22 stores information, a program, and the like to be used in processing for controlling the functions of the first in-vehicle device 20. The storage unit 22 may be, for example, a semiconductor memory, a magnetic memory, an optical memory, or the like. The storage unit 22 may function as, for example, a main storage device or an auxiliary storage device. The storage unit 22 may be a cache memory or the like included in the controller 21. Alternatively, the storage unit 22 may be a volatile storage device or may be a nonvolatile storage device. In the embodiment, for example, as described below in detail, the storage unit 22 may store information or the like to be used to convert the signal received from the control device 10 to be transmittable through the in-vehicle network 3 and to transmit the signal to the second in-vehicle device 30.

The communication unit 23 performs communication with the control device 10 under the control of the controller 21. The communication unit 23 may be communicable with the control device 10 in a case where the connection terminal 27 described below is connected to the connection terminal 17 of the control device 10. The communication unit 23 may include any wired communication module, such as a USB communication module, an HDMI communication module, or a wired LAN communication module, in order to perform communication with the control device 10. The communication unit 23 further performs communication with the second in-vehicle device 30 included in the vehicle 2 through the in-vehicle network 3, such as a CAN. To this end, the communication unit 23 may include an in-vehicle network communication module, such as a CAN communication module. The communication unit 23 is not limited to wired communication, and may include any wireless communication module, such as a wireless LAN communication module or a Bluetooth communication module.

The power supply unit 24 supplies electric power to be used in the operation of the first in-vehicle device 20. The power supply unit 24 may include, for example, an adapter for receiving power supply from an external power supply, such as a battery of the vehicle 2, and may be supplied with electric power from the external power supply. Alternatively, the power supply unit 24 may include, for example, a dry battery, a storage battery, or the like.

The output unit 25 outputs information in a form of sound, vibration, light, an image, or the like under the control of the controller 21. The output unit 25 may include, for example, at least one of a speaker, a vibrator, a light, a display device, and the like. The output unit 25 may output information regarding a connection state or the like to the control device 10.

The input unit 26 receives an input operation from the user. The input unit 26 may include, for example, at least one of a physical key, such as a power button, an input device, such as a touch panel, a microphone that receives voice input, a camera that receives a gesture input, and the like. In a case where an input operation of the user is received, the input unit 26 transmits the input operation as electronic information to the controller 21.

The connection terminal 27 is connected to the connection terminal 17 of the control device 10. The connection terminal 27 may be connected to the connection terminal 17 of the control device 10, for example, in a case where the control device 10 is inserted into the slot of the first in-vehicle device 20. The first in-vehicle device 20 is connected to be communicable with the control device 10 in a case where the connection terminal 27 is connected to the connection terminal 17 of the control device 10. Examples of the connection terminal 27 may include a USB terminal, an HDMI terminal, a LAN terminal, and the like.

In a case where the connection terminal 27 is connected to the connection terminal 17 of the control device 10, the functions of the first in-vehicle device 20 may be controlled by the controller 11 of the control device 10. The controller 21 may control each function of the first in-vehicle device 20 based on a control command from the controller 11 of the control device 10. For example, the controller 11 may output information from the output unit 25 or may receive an input operation from the user through the input unit 26 based on a control command from the controller 11 of the control device 10.

Hereinafter, processing of the first in-vehicle device 20 that is implemented by the controller 21 controlling the functions of the first in-vehicle device 20 will be described. The first in-vehicle device 20 receives a signal including a control command to the second in-vehicle device 30 from the control device 10. The first in-vehicle device 20 converts the received signal including the control command to the second in-vehicle device 30 to be transmittable through the in-vehicle network 3 and transmits the signal to the second in-vehicle device 30. The first in-vehicle device 20 converts the signal including the control command to be transmittable through the in-vehicle network 3 or stores information including a control command set, setting information, a program, and the like to be used to transmit the converted signal to the second in-vehicle device 30.

Processing Example of First In-Vehicle Device

Figure 5:
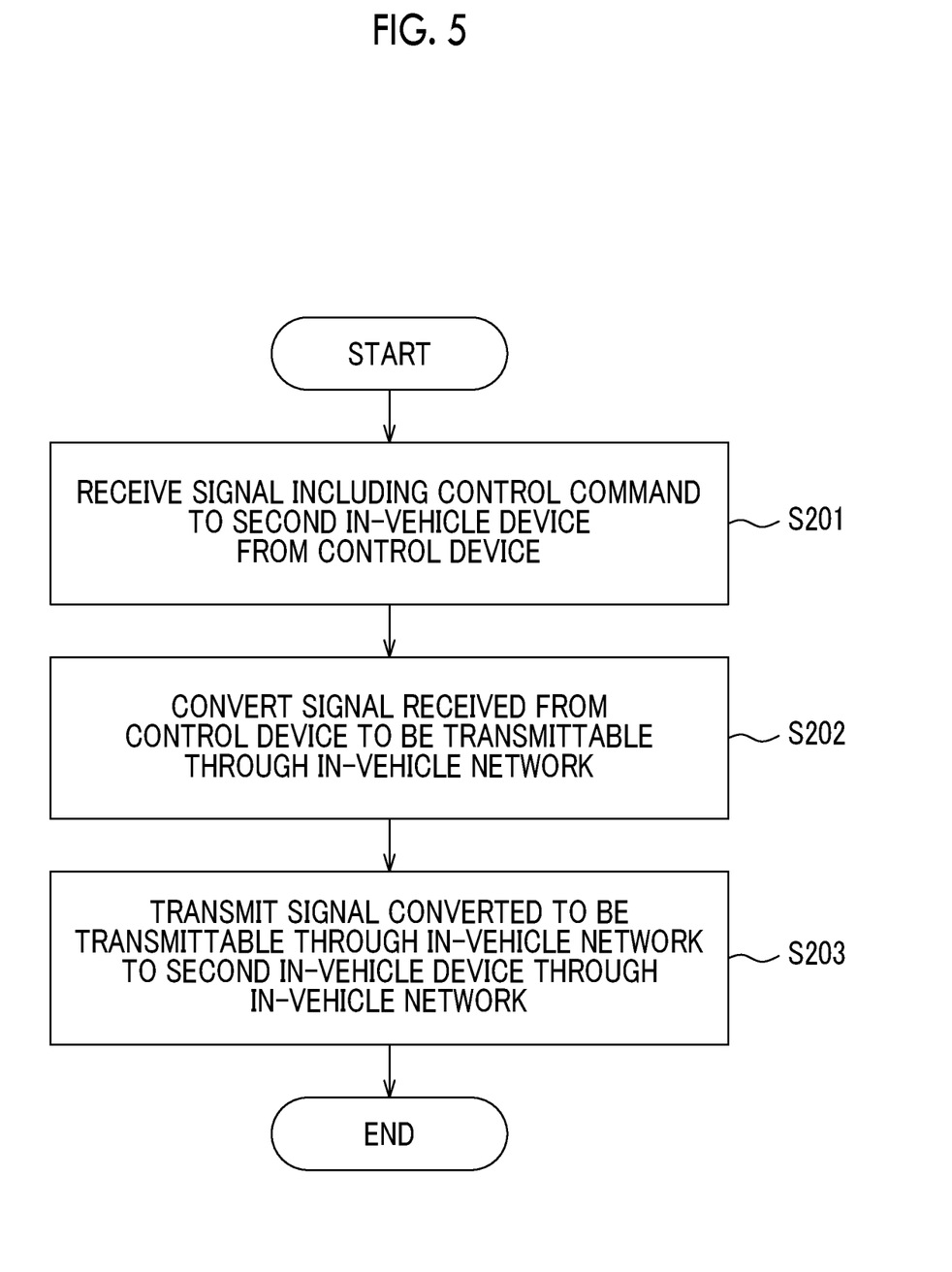
FIG. 5 is a sequence diagram showing the operation of the first in-vehicle device.

A flow of the processing of the first in-vehicle device 20 according to the embodiment will be described referring to FIG. 5.

Step S201: The first in-vehicle device 20 receives the signal including the control command to the second in-vehicle device 30 from the control device 10.

Step S202: The first in-vehicle device 20 converts the signal received from the control device 10 to be transmittable through the in-vehicle network 3.

Step S203: The first in-vehicle device 20 transmits the signal converted to be transmittable through the in-vehicle network 3 to the second in-vehicle device 30 through the in-vehicle network 3.

The in-vehicle information processing system 1 according to the embodiment may be applied to the vehicle 2 that is used in, for example, car rental, car sharing, or the like. The user may perform initial registration through a Web service or the like of car rental and allocates a user ID of the user. The user may register information of a destination and user information as information relating to a musical piece, a playlist, a seat position, air conditioning, and the like through the Web service. In a case where the user makes a reservation for car rental, the user ID and the user information registered by the user through the Web service, information for specifying the vehicle 2 to be used by the user, and information to be used in the control of the second in-vehicle device 30 included in the vehicle 2 may be registered in the control device 10 at a car rental shop. The user receives the control device 10 with information registered at the car rental shop and inserts the control device 10 into the first in-vehicle device 20 of the vehicle 2. With this, in a case where the user powers on the vehicle 2, for example, road guidance to the destination is displayed in the car navigation system, the air conditioning temperature is set, and the seat position is set.

As described above, the in-vehicle information processing system 1 according to the embodiment includes the first in-vehicle device 20 included in the vehicle 2, the second in-vehicle device 30 connected to be communicable with the first in-vehicle device 20 through the in-vehicle network 3 and included in the vehicle 2, and the control device 10 detachably connected to the first in-vehicle device 20. The control device 10 stores information to be used in the control of the second in-vehicle device 30. The control device 10 transmits, to the first in-vehicle device 20, the signal including the control command to the second in-vehicle device 30. The first in-vehicle device 20 converts the received signal including the control command to the second in-vehicle device 30 to be transmittable through the in-vehicle network 3 and transmits the signal to the second in-vehicle device 30. According to such a configuration, in a case where the control device 10 is connected to the first in-vehicle device 20, the control device 10 can control the second in-vehicle device 30 included in the vehicle 2. With this, the user of the control device 10 stores information to be used in the control of the second in-vehicle device 30 in the control device 10 in advance, whereby the user can readily use the second in-vehicle device 30, and convenience of a technique relating to control of an in-vehicle device included in a vehicle is improved.

As described above, the control device 10 in the in-vehicle information processing system 1 according to the embodiment is updatable information to be used in the control of the second in-vehicle device 30 in a state of being not connected to the first in-vehicle device 20. With this, the user of the control device 10 can operate the second in-vehicle device 30 in a state in which the vehicle 2 is powered on in order to supply electric power to the first in-vehicle device 20 and the second in-vehicle device 30 or can update information registered in the control device 10 without waiting until the update processing based on OTA reprogramming or the like is completed.

As described above, the control device 10 in the in-vehicle information processing system 1 according to the embodiment stores information to be used in the control of the second in-vehicle device 30 in association with information for specifying the vehicle 2, in which the second in-vehicle device 30 is included. With this, the control device 10 can be used in order to control the second in-vehicle devices 30 included in a plurality of different vehicles 2, and the convenience of the technique relating to the control of the in-vehicle device included in the vehicle is improved.

As described above, the control device 10 in the in-vehicle information processing system 1 according to the embodiment stores information to be used in the control of the second in-vehicle device 30 in association with information for specifying the user. With this, the control device 10 can transmit a different control command for each user to the second in-vehicle device 30, whereby the convenience of the technique relating to the control of the in-vehicle device included in the vehicle is improved.

Although the embodiments have been described based on the drawings and the example, it should be noted that those skilled in the art can easily make various modifications and corrections based on the scope of the claims. Accordingly, it should be noted that such modifications and corrections are included in the scope of the claims. For example, the functions and the like included in respective means or respective steps can be rearranged as long as there is no logical contradiction, and two or more means or steps may be combined into single means or step or may be divided.

A configuration may be provided in which, for example, an information processing device, such as a smartphone or a computer, is made to function as the control device 10 or the first in-vehicle device 20 according to the above-described embodiment. Specifically, a program in which processing contents for implementing the functions of the control device 10, the first in-vehicle device 20, or the like according to the embodiment are described is stored in a memory of the information processing device, and a processor of the information processing device is made to read and execute the program. Accordingly, the disclosure according to the embodiment can also be implemented as a program to be executable by the processor.

What is claimed is:

1. An in-vehicle information processing system comprising: a first in-vehicle device included in a vehicle; a second in-vehicle device connected to be communicable with the first in-vehicle device through an in-vehicle network and included in the vehicle; and a control device configured to be detachably connected to the first in-vehicle device, wherein the control device is configured to store information to be used in control of the second in-vehicle device in association with one of information for specifying the vehicle in which the second in-vehicle device is included and information for specifying a user,
the control device is configured to transmit, to the first in-vehicle device,
a signal including a control command to the second in-vehicle device, and the first in-vehicle device is configured to convert the signal including the control command to the second in-vehicle device received from the control device to be transmittable through the in-vehicle network and transmit the converted signal to the second in-vehicle device, wherein the control device is configured to update the information to be used in the control of the second in-vehicle device in a state of being not connected to the first in-vehicle device.

2. The in-vehicle information processing system according to claim 1, wherein the second in-vehicle device is configured to control at least one of accessory device of the vehicle.

3. The in-vehicle information processing system according to claim 2, wherein the second in-vehicle device is configured to control the at least one accessory device of the vehicle based on the signal received from the first in-vehicle device.

4. The in-vehicle information processing system according to claim 1, wherein the second in-vehicle device is configured to control at least one of a car navigation system, a media player, an in-vehicle sensor, air conditioning device, and an actuator configured to change a seat position, of the vehicle.

5. A non-transitory storage medium storing a program, wherein, when the program is executed by a control device detachably connected to a first in-vehicle device included in a vehicle, the program causes the control device to execute operations including:
storing information to be used in control of a second in-vehicle device in association with one of information for specifying the vehicle in which the second in-vehicle device is included and information for specifying a user, the second in-vehicle device being connected to be communicable with the first in-vehicle device through an in-vehicle network and included in the vehicle; transmitting, to the first in-vehicle device, a signal including a control command to the second in-vehicle device; and
causing the first in-vehicle device to convert the signal including the control command to the second in-vehicle device to be transmittable through the in-vehicle network and to transmit the converted signal to the second in-vehicle device, wherein the control device updates the information to be used in the control of the second in-vehicle device in a state of being not connected to the first in-vehicle device.

6. A device which is configured to function as a first in-vehicle device included in a vehicle, and is configured to be detachably connected to a control device that stores information to be used in control of a second in-vehicle device in association with one of information for specifying the vehicle in which the second in-vehicle device is included and information for specifying a user, the device comprising circuitry configured to:
communicate with the second in-vehicle device included in the vehicle through an in-vehicle network; receive a signal including a control command to the second in-vehicle device from the control device; convert the received signal including the control command to the second in-vehicle device to be transmittable through the in-vehicle network; and transmit the converted signal to the second in-vehicle device, wherein the control device is configured to u date the information to be used in the control of the second in-vehicle device in a state of being not connected to the first in-vehicle device.

* * * * *